UNITED STATES PATENT OFFICE.

MAURICE W. GRINNELL, OF MOUNT VERNON, NEW YORK.

ARTIFICIAL FRUIT AND OTHER ARTICLES AND PROCESS FOR MAKING THE SAME.

1,366,380.         Specification of Letters Patent.    Patented Jan. 25, 1921.

No Drawing.    Application filed May 8, 1920. Serial No. 379,721.

*To all whom it may concern:*

Be it known that I, MAURICE W. GRINNELL, a citizen of the United States, residing at Mount Vernon, in the county of Westchester and State of New York, have invented certain new and useful Improvements in Artificial Fruits and other Articles and Processes for Making the Same, fully described in the following specification.

This invention relates to improvements in artificial fruit and other articles, and process for making the same.

Artificial fruit has heretofore been made by covering a form of cotton batting or similar material with a layer of glycerin and gelatin by dipping the form in a solution of gelatin in warm water to which glycerin has been added in such proportion that the layer remains soft after it is dry. The surface of such artificial fruit has usually been coated with powder, cotton flock or alum to give it the appearance of natural fruit.

Such artificial fruit having a soft and pliable surface consisting chiefly of gelatin and glycerin has proven unsatisfactory in that its surface has had a tendency to run when heated and to dissolve when moistened. Thus when two pieces of such artificial fruit are placed close together in a window, or in other positions where they are exposed directly to the sunlight, they become melted and run together. A similar effect on the articles is produced by a humid atmosphere. Such artificial fruit has also had the disadvantage of being injured by water.

After extensive tests and experiments, I have discovered that the surface of artificial fruit consisting chiefly of gelatin and glycerin may be insolubilized and thus made impervious to heat and water without making the surface hard or brittle. I have discovered further that this may be accomplished after the surface has been treated to give it the appearance of natural fruit in the manner above described.

In carrying out my process, I dip the artificial fruit or other article in a solution which has the effect of insolubilizing the surface of the article, or the gelatin contained at the surface. The insolubilizing solution should be of sufficient strength to produce a surface which will not run when subjected to heat or moisture, or both, but not sufficiently strong to form a hard or brittle surface.

In order that my invention may clearly be understood, I will describe in detail a method embodying it which I have found most satisfactory in practice.

Formaldehyde may be used as the insolubilizing agent. A standard U. S. P. solution of formaldehyde (containing 37.3% of formaldehyde by weight) is diluted with water, four parts of the U. S. P. solution to ninety-six parts of water being used. A solution containing about $1\frac{1}{2}\%$ of formaldehyde is thus obtained. The article consisting of a form covered with gelatin and glycerin is dipped in the solution of formaldehyde thus prepared. In this dipping the article may be held by the wire customarily inserted in the form when the form is made. The article is then removed from the solution, and the solution retained upon its surface is allowed to dry.

The result of this process is to prevent the surface of the article from melting or running when subjected to heat or moisture, or both, and to make it waterproof. But the surface is not made hard or brittle.

The surface of the article may be coated with powder, cotton flock, or other substance, to give it the appearance of natural fruit before the article is dipped in the formaldehyde solution. Such treatment in no way interferes with the process as the solution passes through the powder or other substance and acts directly upon the gelatin. The dipping in no way changes the appearance of the article, which may have been previously made to simulate natural fruit by the means above described. Articles having a surface composed of gelatin and glycerin treated in this way may be placed close together in the sunlight or in a humid atmosphere without any resultant running together or sticking. Furthermore the articles are not injured by water.

My invention is by no means limited to the exact procedure described. While I have obtained most satisfactory results by dipping the articles in the insolubilizing solution, the solution may be applied to the surface of the articles in other ways, as, for example, by spraying it upon them by means of an air brush. While I have found the use of formaldehyde most satisfactory, my invention in its broadest aspect is not limited to the use of any particular insolubilizing agent.

My invention is by no means limited to artificial fruit, but is applicable to any articles which may be made with an outer layer of gelatin and glycerin, or containing gelatin. Among such articles are artificial vegetables, artificial flowers, dolls' heads, toys, etc.; and also artificial flower petals and appliqué fruit, such as that described in the pending application of Maurice W. Grinnell and Edward Sindic, Serial No. 380,008, filed May 8, 1920.

What is claimed is:

1. As a new article of manufacture, an article having a soft outer layer composed chiefly of gelatin and glycerin, and having a soft and pliable water-resisting and heat-resisting surface.

2. As a new article of manufacture, an article comprising a form of cotton batting or similar material covered with a soft layer of glycerin and gelatin having a pliable surface insolubilized by the action of formaldehyde.

3. As a new article of manufacture, artificial fruit comprising a form covered with a soft layer of gelatin and glycerin, having a pliable surface treated to resemble natural fruit, and insolubilized by the action of formaldehyle.

4. In the process of manufacturing artificial fruits and other articles, applying to the surface of an article containing gelatin, a solution containing an active insolubilizing agent.

5. In the process of manufacturing artificial fruits and other articles, applying to the surface of an article containing gelatin at its surface, an active insolubilizing solution containing a small percentage of formaldehyde.

6. In the process of manufacturing artificial fruit and other articles, dipping an article having a soft surface consisting chiefly of gelatin and glycerin into an active insolubilizing solution of formaldehyde and water containing about $1\frac{1}{2}\%$ of formaldehyde, removing the articles from the solution, and evaporating the water of the solution retained upon its surface.

7. In the process of manufacturing artificial fruit and other articles, dipping an article having a soft surface consisting chiefly of gelatin and glycerin into an active insolubilizing solution of formaldehyde in water containing a small percentage of formaldehyde, removing the article from the solution, and evaporating the water of the solution contained on its surface.

In testimony whereof I have hereunto set my hand in the presence of two subscribing witnesses.

MAURICE W. GRINNELL.

Witnesses:
E. P. BERGERON,
W. C. SAGGARD.